US011402616B2

(12) United States Patent
Schumann

(10) Patent No.: US 11,402,616 B2
(45) Date of Patent: Aug. 2, 2022

(54) CHANGING SYSTEM FOR A MICROSCOPE

(71) Applicant: Leica Microsystems CMS GmbH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 797 days.

(21) Appl. No.: 16/325,729

(22) PCT Filed: Aug. 3, 2017

(86) PCT No.: PCT/EP2017/069615
§ 371 (c)(1),
(2) Date: Feb. 15, 2019

(87) PCT Pub. No.: WO2018/033398
PCT Pub. Date: Feb. 22, 2018

(65) Prior Publication Data
US 2021/0356720 A1  Nov. 18, 2021

(30) Foreign Application Priority Data
Aug. 16, 2016 (DE) .................... 10 2016 115 140.8

(51) Int. Cl.
*G02B 15/06* (2006.01)
*G02B 7/04* (2021.01)
(Continued)

(52) U.S. Cl.
CPC .............. *G02B 15/06* (2013.01); *G02B 7/04* (2013.01); *G02B 13/0065* (2013.01); *G02B 21/04* (2013.01)

(58) Field of Classification Search
CPC ...... G02B 15/06; G02B 7/04; G02B 13/0065; G02B 21/04
See application file for complete search history.

(56) References Cited

U.S. PATENT DOCUMENTS 4,498,742 A * 2/1985 Uehara ............... G03F 7/70091
355/53
4,640,586 A * 2/1987 Iba .......................... G02B 21/02
359/377

(Continued)

FOREIGN PATENT DOCUMENTS

CN 101655601 A 2/2010
CN 102385151 A 3/2012
(Continued)

*Primary Examiner* — William R Alexander
*Assistant Examiner* — Sharrief I Broome
(74) *Attorney, Agent, or Firm* — Leydig, Voit & Mayer, Ltd.

(57) ABSTRACT

A changing system for a microscope includes multiple afocal enlargement changing modules of different enlargement levels that are optionally introducible into an infinite beam path running along an optical axis of the microscope. Each of the enlargement changing modules contain a light deflection system. The light deflection systems are designed to adjust the path length of the infinite beam path passing through the respective enlargement changing module in such a way that all of the enlargement changing modules, regardless of the different enlargement levels of the enlargement changing modules, map an exit pupil of a lens of the microscope onto the same location along the optical axis.

17 Claims, 13 Drawing Sheets

(51) Int. Cl.
*G02B 13/00* (2006.01)
*G02B 21/04* (2006.01)

(56) References Cited

U.S. PATENT DOCUMENTS

| | | | |
|---|---|---|---|
| 4,945,220 | A | 7/1990 | Mallory et al. |
| 5,394,267 | A * | 2/1995 | Hanzawa ............... G02B 21/22 |
| | | | 359/376 |
| 6,088,083 | A | 7/2000 | Meier |
| 8,144,395 | B2 | 3/2012 | Wilson et al. |
| 8,582,203 | B2 | 11/2013 | Dunsby |
| 2002/0149844 | A1 | 10/2002 | Pensel et al. |
| 2003/0117727 | A1* | 6/2003 | Weber .................... G02B 7/004 |
| | | | 359/831 |
| 2011/0043904 | A1* | 2/2011 | Lucke ................ G02B 21/0012 |
| | | | 359/376 |
| 2012/0050851 | A1 | 3/2012 | Euteneuer et al. |
| 2015/0043065 | A1 | 2/2015 | Hong et al. |

FOREIGN PATENT DOCUMENTS

| | | |
|---|---|---|
| CN | 103323939 A | 9/2013 |
| CN | 205229560 U | 5/2016 |
| DE | 1199018 B | 8/1965 |
| EP | 1233294 A2 | 8/2002 |
| EP | 1988417 A1 | 11/2008 |
| JP | 2010117624 A | 5/2010 |

* cited by examiner

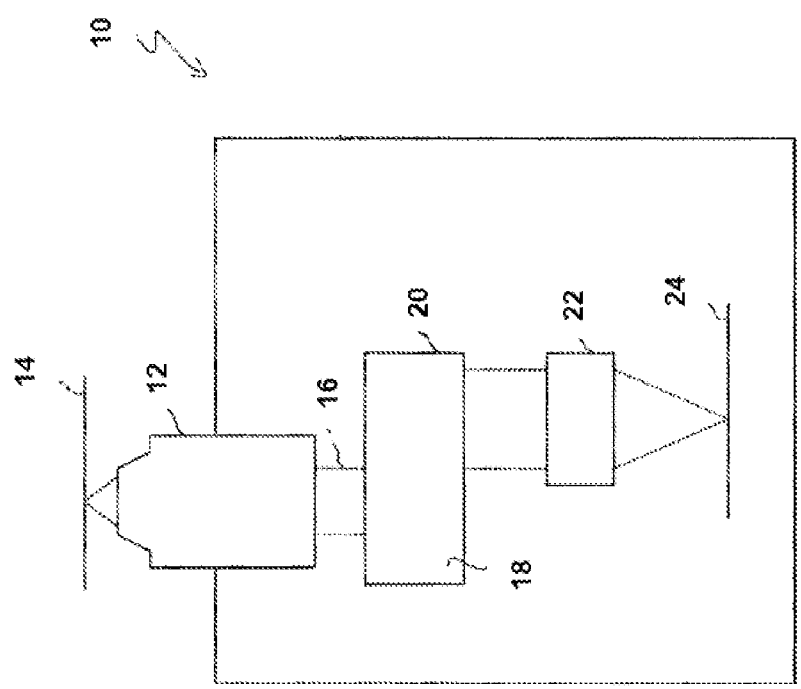

CHANGING SYSTEM FOR A MICROSCOPE

CROSS-REFERENCE TO PRIOR APPLICATIONS

This application is a U.S. National Stage Application under 35 U.S.C. § 371 of International Application No. PCT/EP2017/069615 filed on Aug. 3, 2017 and claims benefit to German Patent Application No. DE 10 2016 115 140.8 filed on Aug. 16, 2016. The International Application was published in German on Feb. 22, 2018, as WO 2018/033398 A1 under PCT Article 21(2).

FIELD

The invention relates to a changing system for a microscope, comprising multiple afocal enlargement changing modules of different enlargement levels which can optionally be introduced into an infinite beam path running along the optical axis of the microscope. The invention further relates to an afocal enlargement changing module and a microscope that is equipped with a changing system or an afocal enlargement changing module.

BACKGROUND

Afocal enlargement changers are known for adjustment of the enlargement level in optical microscope systems. In compound microscopes that have an infinite beam path, these enlargement changers are typically realized by telescope optics that are arranged in the infinite beam path between the lens and tube lens, and for example may be changed by means of a revolver or another type of changing device.

The telescope optics used in the enlargement changers do in fact ensure the afocality of the microscope beam path. However, as a result of the different enlargement levels of the telescope optics, the exit pupil of the lens is mapped in different positions along the optical axis, which, combined with the effect of the tube lens, leads to different exit pupil positions of the overall system. The vignetting accompanying this variation of the exit pupil position is typically tolerable.

However, in special microscopy methods it is often necessary to influence the mapping in the Fourier plane, which is situated at the location of the exit pupil of the microscope lens for systems that are telecentric on the object side. Such influencing may, for example, exist in arranging a modulation element such as a spatial light modulator, abbreviated as SLM; a micromirror arrangement, abbreviated as DMD (Digital Mirror Device); or a phase-influencing mask in the Fourier plane. A fixed position of a plane conjugated to the lens pupil is necessary in order to be able to fixedly position the cited components.

In these special microscopy methods, enlargement changers with telescope optics that lead to a variation of the exit pupil position therefore typically cannot be used.

Enlargement changing systems having fixed pupil position are also important in connection with what are known as remote focusing techniques, for example as they are described in U.S. Pat. No. 8,144,395 B2 and U.S. Pat. No. 8,582,203 B2. On the one hand, here a 4f arrangement is required in which a fixed position of the lens pupil is helpful in the implementation, since all system components may thereby be mounted in a stationary manner. However, given a lens change within the arrangement, the enlargement level of the overall system must also be kept constant in order to maintain the required enlargement condition for aberration-free refocusing. However, if a different object-side lens should now be used due to the application, for instance for reasons of cover glass correction, the free working distance, immersion etc., an auxiliary system is required that compensates for possible enlargement changes and thereby allows the image of the lens pupil to be stationary.

SUMMARY

In an embodiment, the present invention provides a changing system for a microscope. The changing system includes multiple afocal enlargement changing modules of different enlargement levels that are optionally introducible into an infinite beam path running along an optical axis of the microscope. Each of the enlargement changing modules contain a light deflection system. The light deflection systems are designed to adjust the path length of the infinite beam path passing through the respective enlargement changing module in such a way that all of the enlargement changing modules, regardless of the different enlargement levels of the enlargement changing modules, map an exit pupil of a lens of the microscope onto the same location along the optical axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic representation of a microscope according to an embodiment of the invention;

DETAILED DESCRIPTION

Figure 2A:
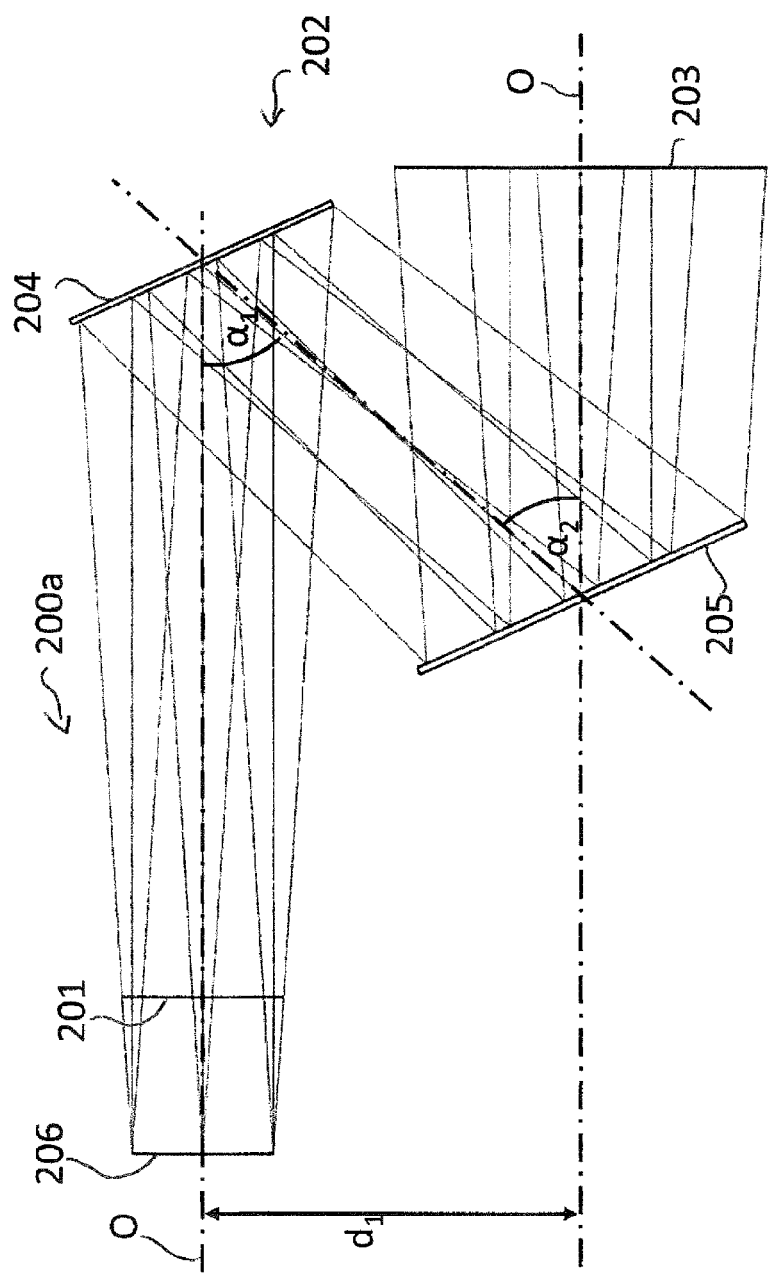
FIGS. 2a to 2d show a first exemplary embodiment of the changing system that comprises four enlargement changing modules.
Figure 2B:
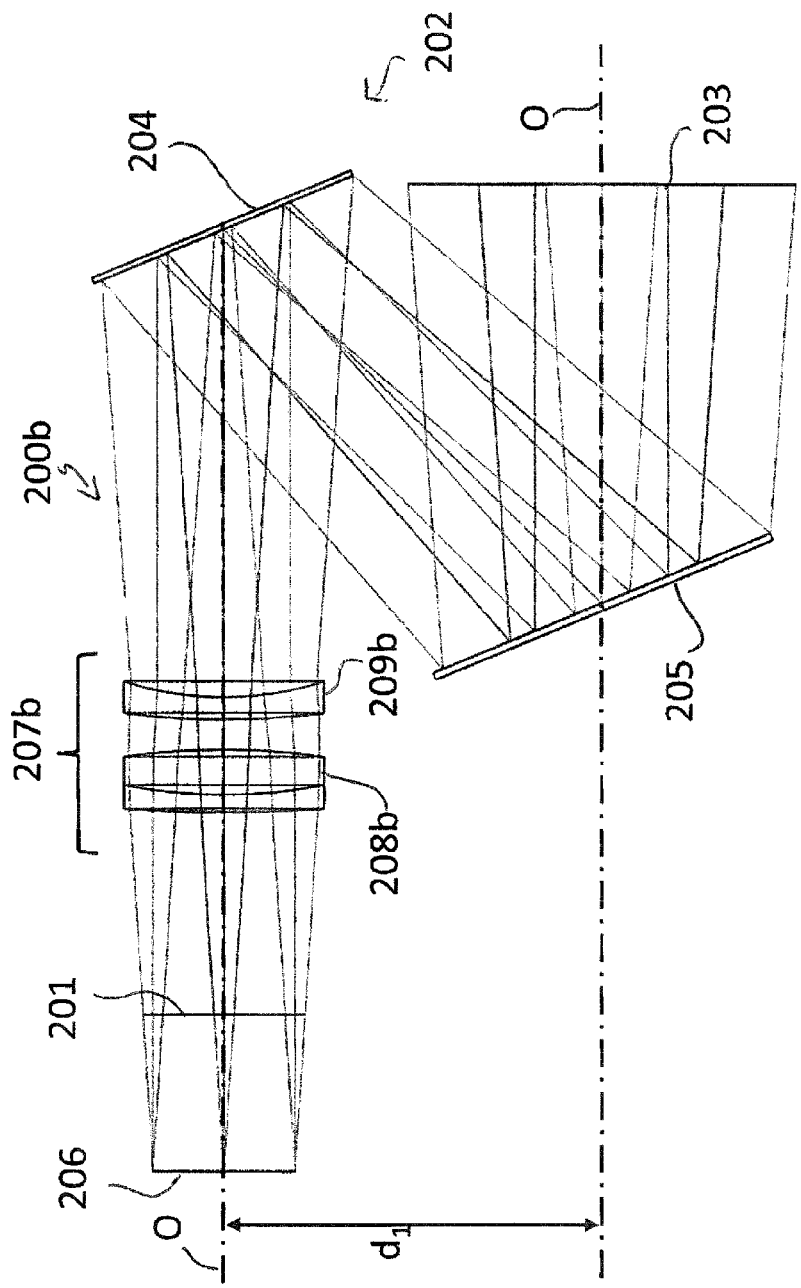
Figure 2C:
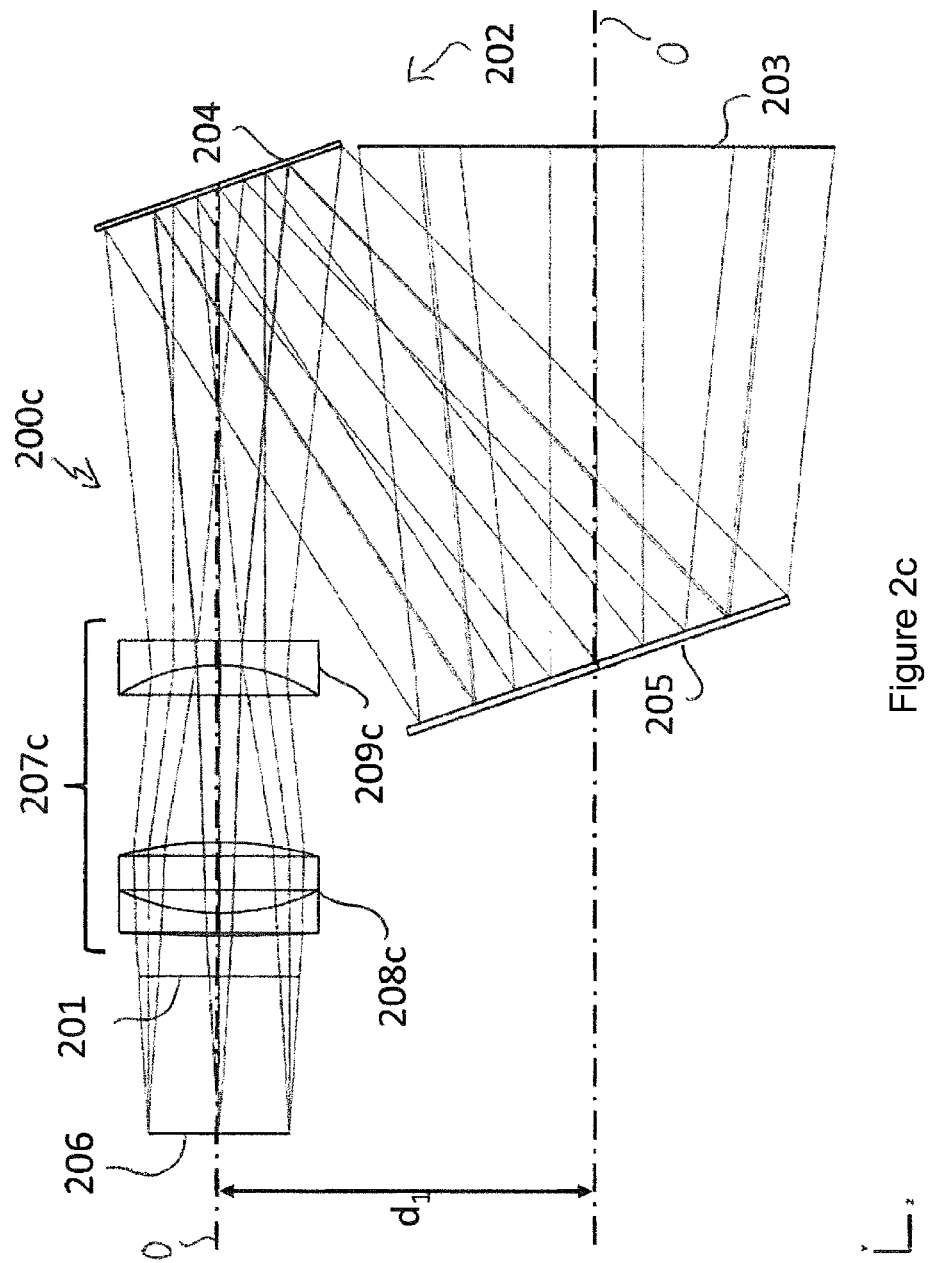
Figure 2D:
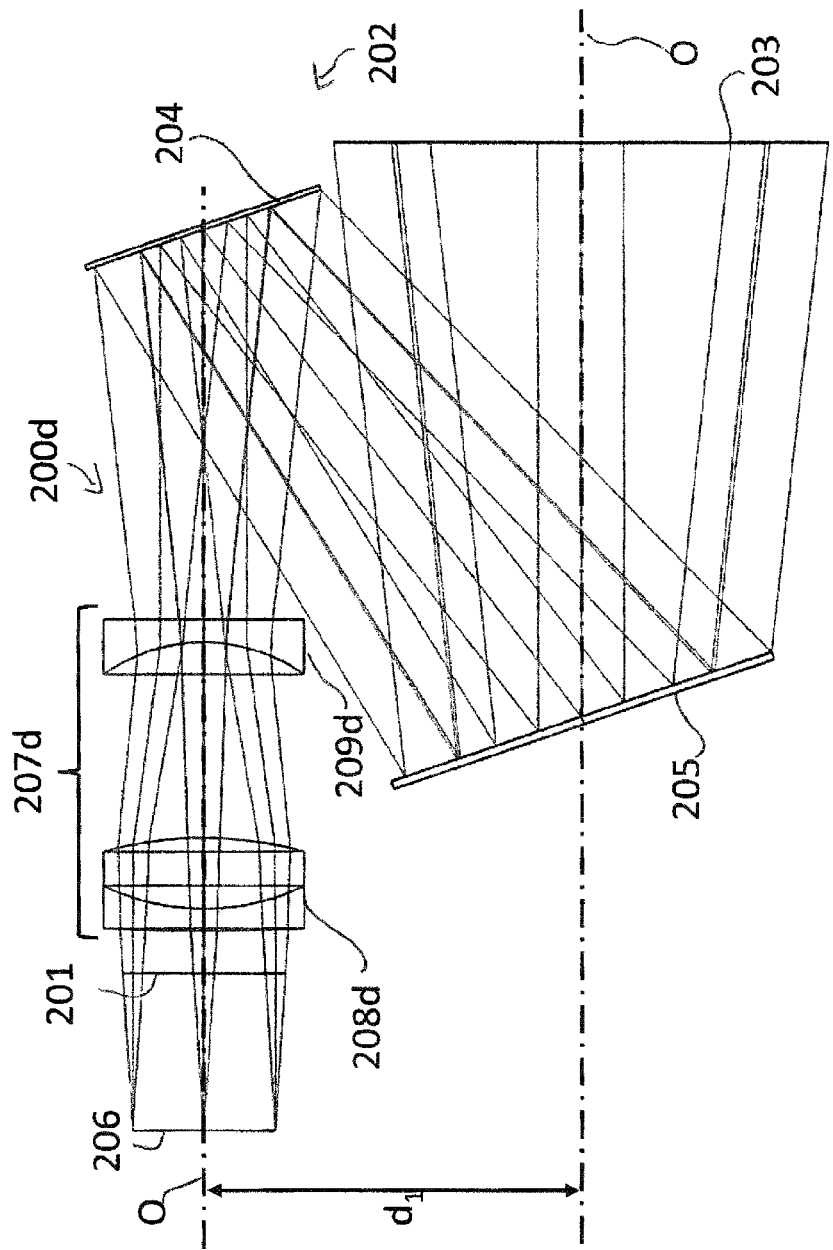

Embodiments of the invention provide a changing system for a microscope, an afocal enlargement changing module, and a microscope equipped with a changing system or an afocal enlargement changing module, which enable the image of the lens pupil to remain stationary with comparably small technical effort, given an enlargement level change.

The changing system according to an embodiment of the invention comprises multiple afocal enlargement changing modules of different enlargement levels which can optionally be introduced into an infinite beam path running along the optical axis of the microscope. The enlargement changing modules respectively contain a light deflection system. The light deflection systems are designed to adjust the path length of the infinite beam path passing through the respective enlargement changing module such that all enlargement changing modules map an exit pupil of an lens of the microscope onto the same location along the optical axis, regardless of their different enlargement levels.

The various light deflection systems that are contained in the enlargement changing modules forming the changing system are formed such that variations in the exit pupil position that are caused by an enlargement level change are compensated. This means that, independently of which of the enlargement changing modules is presently used in the microscope, the image of the lens exit pupil is always generated at the same location.

This standardization of the mapping length with which the exit pupil of the lens is mapped via the respective enlargement changing module, said standardization being realized via the changing system according to an embodiment of the invention, enables an optical component such as an SLM, a DMD, or a phase-influencing mask to be arranged in a stationary manner in a stationary Fourier plane. Given a stationary pupil position, the optically active surface of such a component may then be adapted to the pupil size via a corresponding enlargement, i.e. by introducing a suitable enlargement changing module.

The modularity of the changing system according to an embodiment of the invention is helpful in two respects. On the one hand, the modularity may be used by the manufacturer in such a way that it may be used in the manufacturing of a microscope system which is to have an enlargement changer with a (single) predetermined enlargement level, from a system of different modules which are structurally similar although they have different enlargement levels. This considerably reduces the manufacturing cost. On the other hand, the user of a microscope system may use said modularity in such a way that the system enlargement level varies via a simple enlargement changer, namely the exchange of one enlargement changing module inserted into the microscope for a structurally similar module of different enlargement level. Thus, the changing system according to an embodiment of the invention represents the basis of a quick change design that, for example, uses displacement systems or revolvers, or also linear or rotary changers in manual or motorized embodiments.

The enlargement changing modules preferably have a respective module body that has a changing surface at the light entrance side and a changing surface at the light exit side, wherein the two changing surfaces are arranged identically relative to one another in all module bodies. The changing surfaces represent spatially fixed interfaces, for example in coordination with corresponding mechanical stops within the infinite beam path, the interfaces of which enable the structurally similar module bodies to be changed in a simple manner as needed. The changing surface on the light entry side of the respective module body thereby effectively forms a mechanical reference for the entrance pupil of the enlargement changing module that, given an installed module, is brought into congruence with the exit pupil of the microscope lens. The changing surface of the module body on the light exit side accordingly represents a mechanical reference for the image of the lens exit pupil that is generated within the infinite beam path with incorporation of the enlargement changing module. The aforementioned mechanical reference is thereby to be understood such that, for every enlargement changing module, the exit pupil of the microscope lens has the same position relative to the changing surface on the light entry side, and the image of the exit pupil has the same position relative to the changing surface on the light exit side. Since the two changing surfaces are arranged identically relative to one another in all module bodies, this mechanical reference is also identical relative to the exit pupil or to its image for all enlargement changing modules. If the enlargement changing modules are thus positioned via their changing surfaces at the same position in the infinite beam path, it is ensured that the exit pupil of the lens is always mapped to the same location along the optical axis, regardless of which of the enlargement changing modules is presently used in the microscope.

The modular character of the changing system according to an embodiment of the invention is achieved via the definition of the changing surface on the light entry side and the changing surface on the light exit side, as well as the specification of a maximum installation space in which the respective enlargement changing module must be accommodated. Both the direction and the position of the optical axis are rigidly defined at the changing surfaces, such that the interchangeability of the individual enlargement changing modules is ensured.

The enlargement changing modules preferably each contain an enlargement system which is a Keplerian telescope or a Galilean telescope, for example. For reasons of a smaller installation space, the embodiment as a Keplerian telescope is particularly advantageous. In a preferred embodiment, the respective enlargement system is arranged downstream of the light deflection system in the infinite beam path.

The positioning of the enlargement system within the respective module body, and the focal lengths of the optical elements forming the enlargement system, may be chosen so that the total length of the respective module is minimized and thus the maximum space to be provisioned is limited.

The light deflection systems preferably each produce an identical offset of a part of the optical axis passing through the changing surface on the light exit side relative to a part of the optical axis passing through the changing surface on the light entry side. Due to this identical offset, position and alignment of the optical axis at the changing surfaces are identically defined for all enlargement changing modules so that the interchangeability of the individual modules is ensured.

In a particular embodiment, the part of the optical axis that passes through the changing surface on the light exit side has a predetermined parallel offset relative to the part of the optical axis that passes through the changing surface on the light entry side. A beam deflection of 180° may also be realized via this embodiment.

A beam deflection by 90° is present if the part of the optical axis that passes through the changing surface on the light exit side is deflected at a right angle relative to the part of the optical axis that passes through the changing surface on the light entry side, and is arranged at a predetermined distance from the changing surface on the light entry side.

In a preferred embodiment, the light deflection systems each comprise at least one first and one second light-reflecting element, wherein the first light-reflecting element is arranged on the part of the optical axis passing through the changing surface on the light entry side and the second light-reflecting element is arranged on the part of the optical axis passing through the changing surface on the light exit side. By suitable choice of the relative arrangement of the two light-reflecting elements forming the light deflection systems, the path length of the infinite beam path within the respective enlargement changing module may be adjusted in the desired manner in order to achieve the stationary pupil mapping. The use of two light-reflecting elements also has the advantage that a beam deflection that is required anyway in the microscope may be ensured without image reversal.

The two light-reflecting elements are preferably parts of a mirror arrangement or a prism. In particular, the use of Smith prism or pentaprism or a mirror arrangement equivalent to this is considered for the right-angled beam deflection mentioned further above.

The changing system may also contain an enlargement changing module with an enlargement level equal to 1. This means that only the light deflection system, but not the enlargement system provided in the other modules, is present in this module.

According to a further embodiment of the invention, an afocal enlargement changing module is provided for a microscope, the afocal enlargement changing module of which can be introduced into an infinite beam path running along the optical axis of the microscope. The enlargement changing module contains a light deflection system that is designed to adjust the path length of the infinite beam path passing through the enlargement changing module such that said enlargement changing module maps an exit pupil of a lens of the microscope onto a predetermined location along the optical axis.

Another embodiment of the invention provides a microscope that comprises a lens with an exit pupil and a changing system or an afocal enlargement changing module as described above.

In a preferred embodiment of the microscope, an optical component such as an SLM, a DMD, or a phase-influencing mask that may be used to influence the microscope imaging is arranged at the location of the image of the exit pupil of the lens, said image being generated by the enlargement changing module.

In a further preferred embodiment of the microscope, the enlargement changing module is part of a 4f system which is preferably used for aberration-free refocusing.

FIG. 1 shows a microscope 10 in a block diagram. The microscope 10 has a lens 12 which receives light originating from an object plane 14. This light exits the lens 12 as a collimated beam and propagates in an infinite beam path 16 to an enlargement changing module 18 having a module body 20. The enlargement changing module 18 is an afocal optical system. The light accordingly exits the enlargement changing module 18 again as a collimated beam. The light is then focused by a tube lens 22 to produce an intermediate image in an intermediate image plane 24.

In the embodiment according to FIG. 1, the light that passes through the afocal enlargement changing module 18 is deflected by the latter such that the infinite beam path 16 experiences a parallel offset.

FIGS. 2a to 2d show four different enlargement changing modules 200a to 200d that respectively form a module corresponding to the enlargement changing module 18 according to FIG. 1. A changing system which may be used to change the overall enlargement level in the microscope 10 is provided by the enlargement changing modules 200a to 200d. To this end, one of the enlargement changing modules 200a to 200d is optionally introduced into the infinite beam path 16 of the microscope 10.

In the exemplary embodiment according to FIGS. 2a to 2d, the enlargement changing module 200a has an enlargement level of 1, the enlargement changing module 200b has an enlargement level of 1.05, the enlargement changing module 200c has an enlargement level of 1.5, and the enlargement changing module 200d has an enlargement level of 1.6. Of course, these specifications are to be understood purely as examples.

On its module body, not shown in FIG. 2a, the enlargement changing module 200a has a changing surface 201 on the light entry side through which the light enters into the module body along the optical axis O. The light is then deflected by a light deflection system 202 within the module body so that it exits from the enlargement changing module 200a with a parallel offset through a changing surface 203 formed on the module body. The part of the optical axis O that passes through the changing surface on the light exit side 203 thus experiences a parallel offset, designated with $d_1$ in FIG. 2a, relative to the part of the optical axis O passing through the changing surface on the light entry side 201.

The light deflection system 202 comprises a first deflection mirror 204 and a second deflection mirror 205. In this instance, the first deflection mirror 204 is located at the part of the optical axis O that passes through the changing surface on the light entry side 201, whereas the second deflection mirror 205 is located at the part of the optical axis O that passes through the changing surface on the light exit side 205a. The two deflection mirrors 204 and 205 are respectively inclined relative to the optical axis O and aligned parallel to one another. Accordingly, the angles $\alpha_1$ and $\alpha_2$ that are shown in FIG. 2a have the same absolute value.

In FIG. 2a, the entry pupil of the enlargement changing module 200a is designated by 206. Along the optical axis O, it has a fixed predetermined distance from the changing surface on the light entry side 201. If the enlargement changing module 200a is located in the infinite beam path 16 of the microscope 10, the entry pupil 206 is arranged at the location of the exit pupil of the lens 12.

In contrast to the enlargement changing module 200a according to FIG. 2a which has an enlargement level of 1, the other enlargement changing modules 200b, 200c, and 200d respectively contain an enlargement system 207b, 207c, or 207d which is formed from two lens groups 208b, 209b; or 208c, 209c; or 208d, 209d, and represents a Keplerian telescope. The changing system comprising the enlargement changing modules 200a to 200d is now designed such that, in all enlargement changing modules 200a to 200d, the distance that the entry pupil 206—and therefore the exit pupil of the lens 12, given an installed module—has from the changing surface on the light entry side 201 is identical. Moreover, the parallel offset $d_1$ of the optical axis O is also the same for all enlargement changing modules 200a to 200d. In order to now ensure that the image of the exit pupil, the position of which is influenced by the different enlargement effects of the enlargement systems 207b, 207c, and 207d, remains stationary for all modules, the two deflection mirrors 204 and 205 forming the light deflection system 202 have a different distance from one another in the individual delay changing modules 200b, 200c, and 200d. In other words, the light deflection system 202 in each of the delay changing modules 200b, 200c, and 200d is matched to the associated enlargement system 207b, 207c, 207d so that all the delay changing modules (including the module 200a without enlargement system) generate the image of the exit pupil at the same location.

As a comparison of FIGS. 2a to 2d shows, the deflection mirrors 204 and 205 are respectively arranged relative to one another so that no shading of the light beam passing through the respective enlargement changing modules occurs. In particular, the distance $d_1$ is therefore selected such that the mapping is possible without vignetting while taking into account the maximum pupil sizes and field angles provided in the system design for all enlargement changing modules 300a to 300d.

Figure 3A:
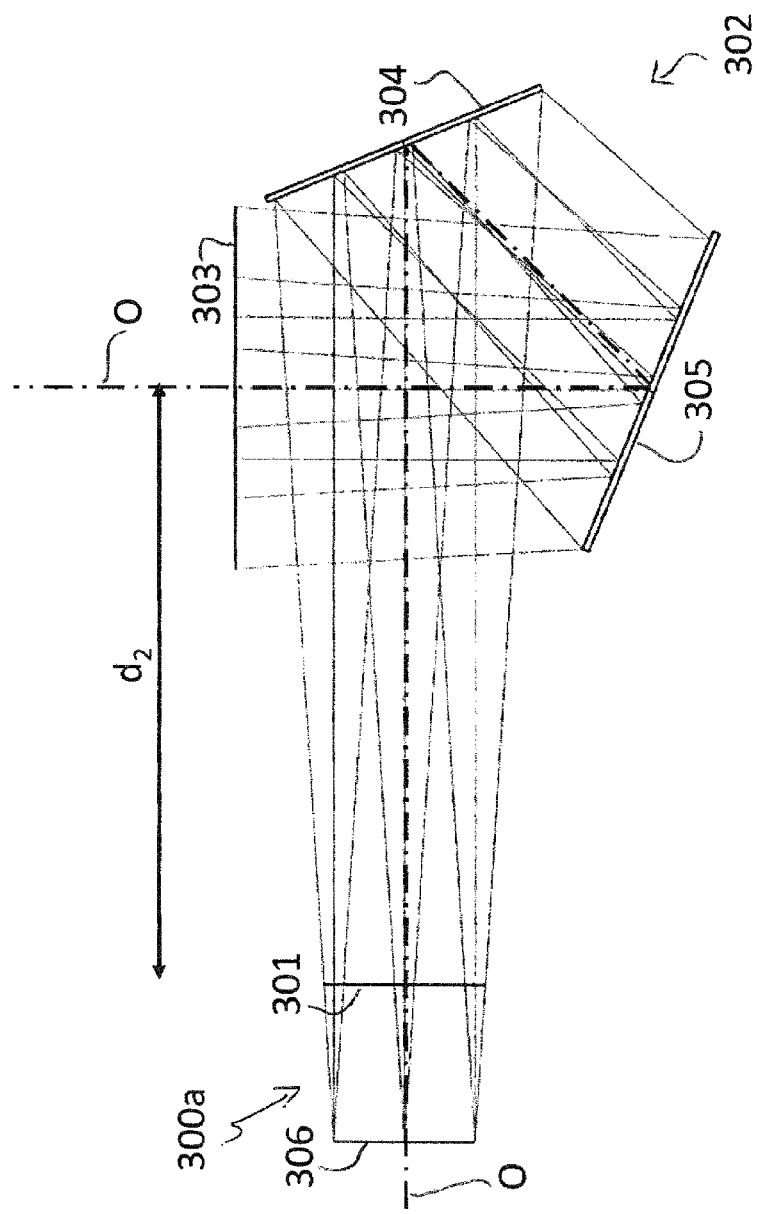
FIGS. 3a to 3d show a second exemplary embodiment of the changing system that comprises four enlargement changing modules.
Figure 3B:
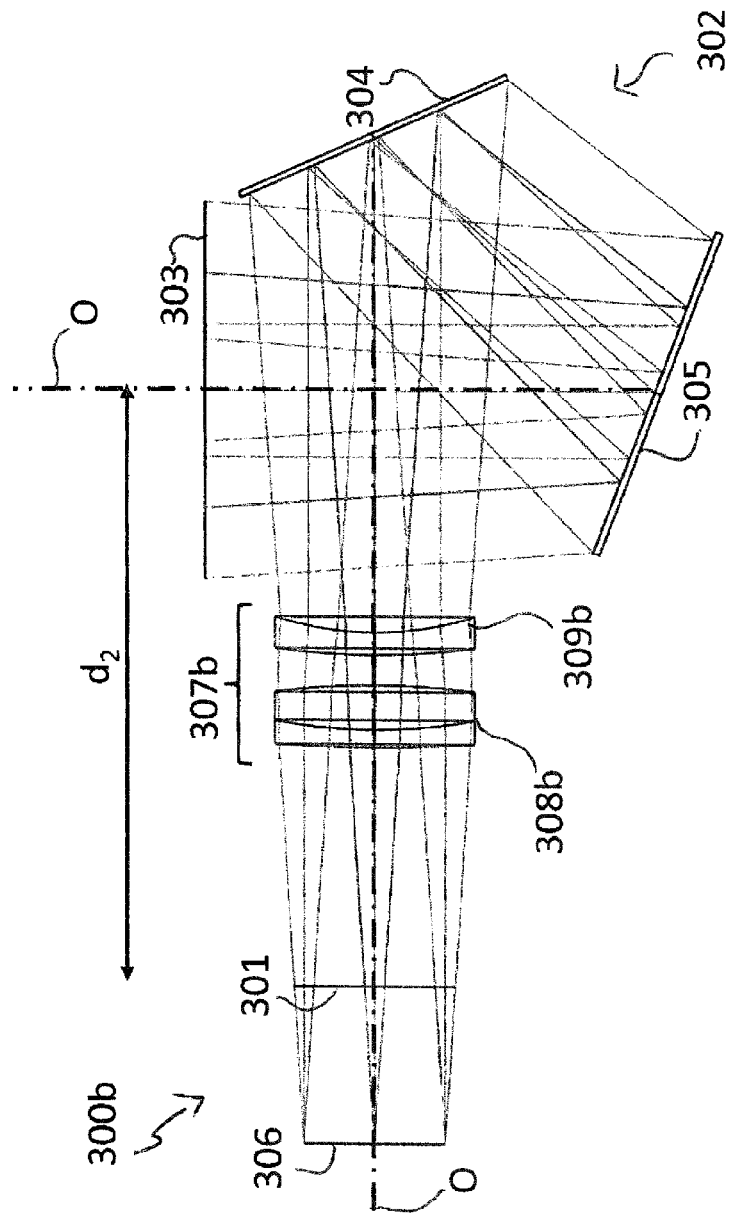
Figure 3C:
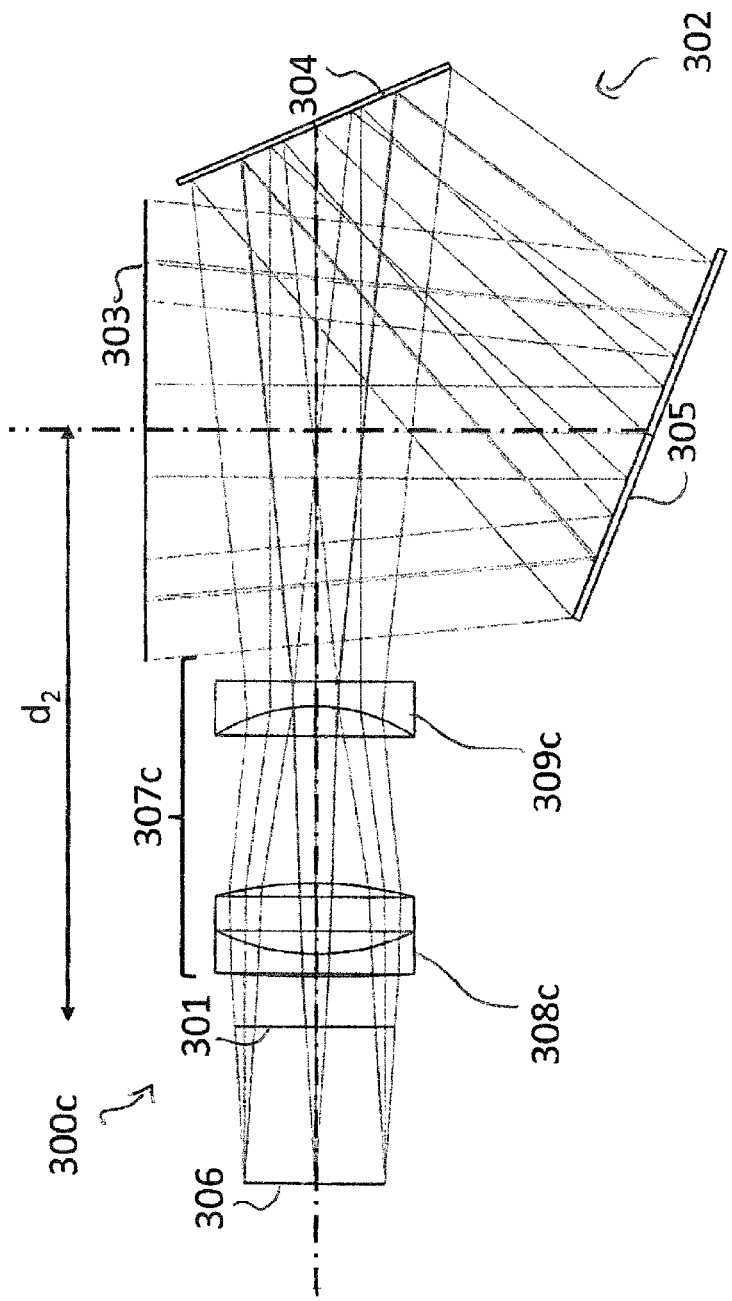
Figure 3D:
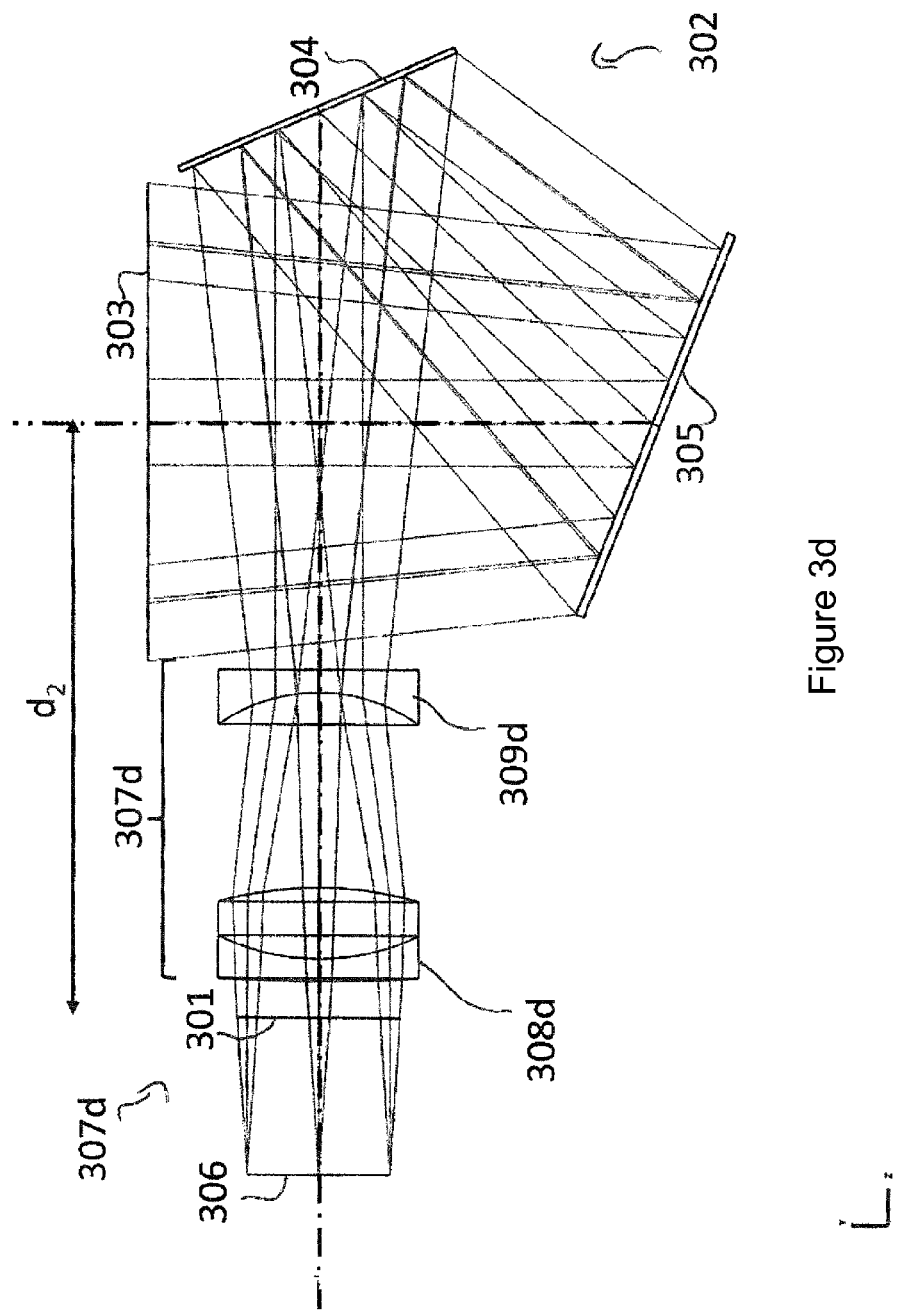
Figure 4A:
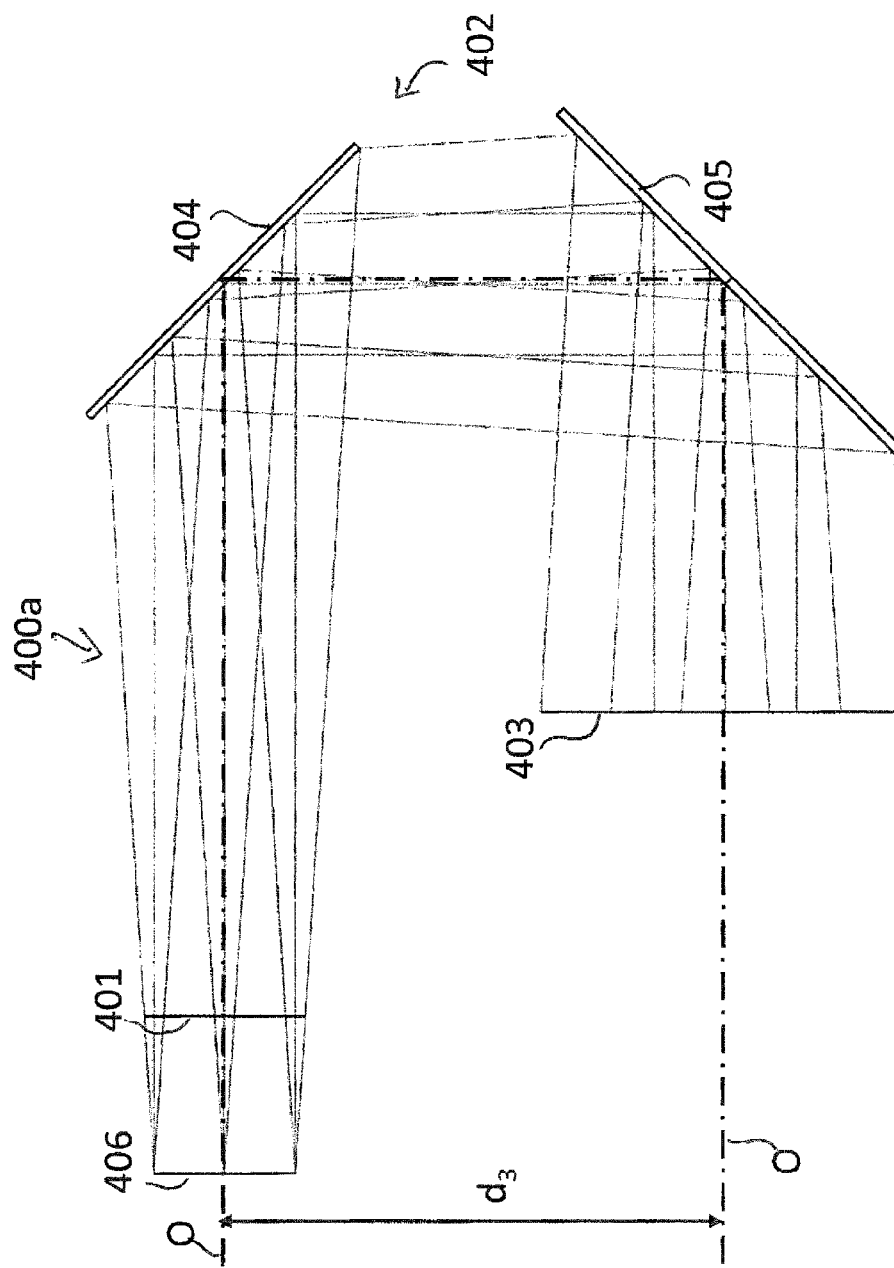
FIGS. 4a to 4d show a third embodiment of the changing system that comprises four enlargement changing modules.
Figure 4B:
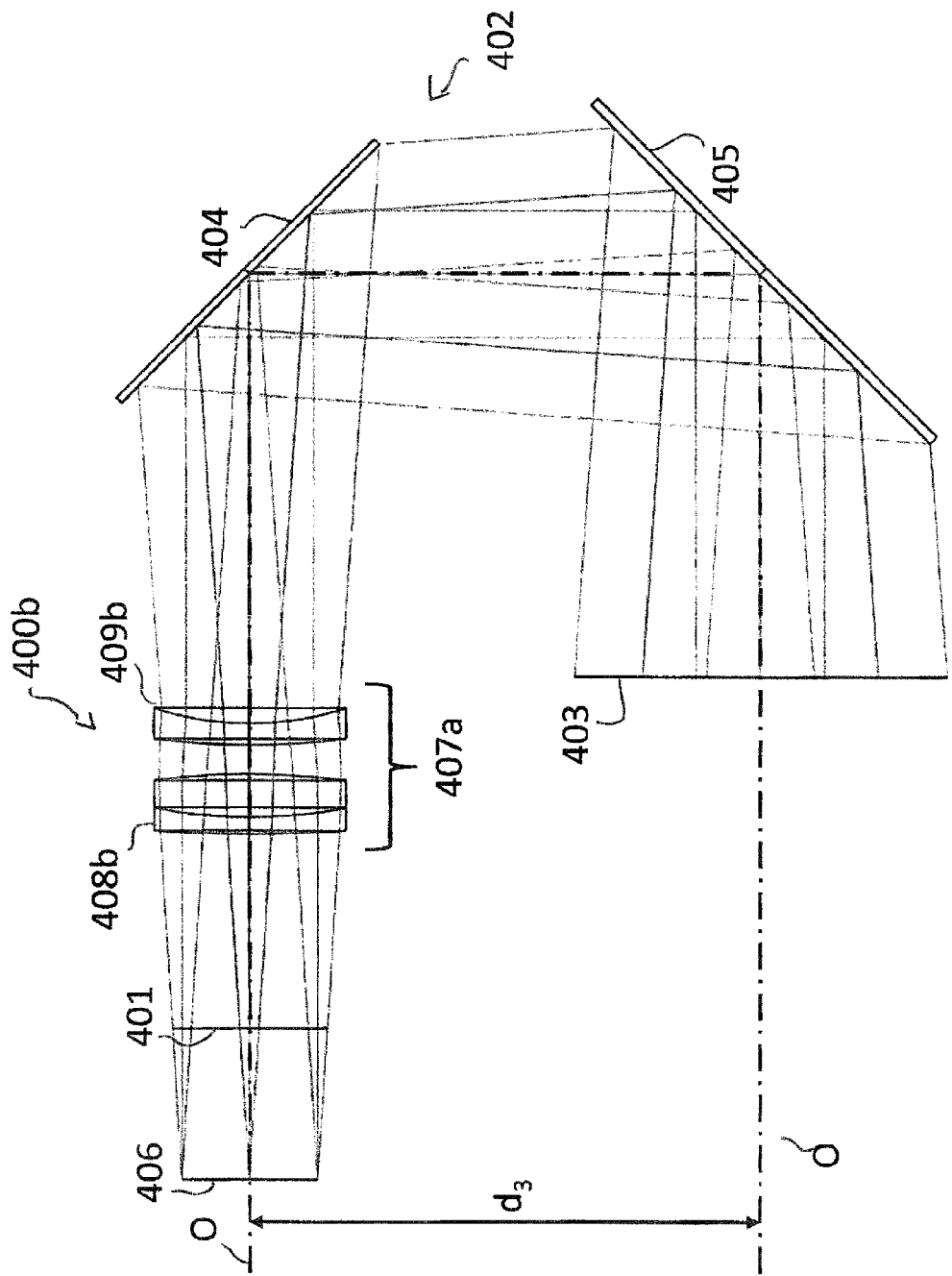
Figure 4C:
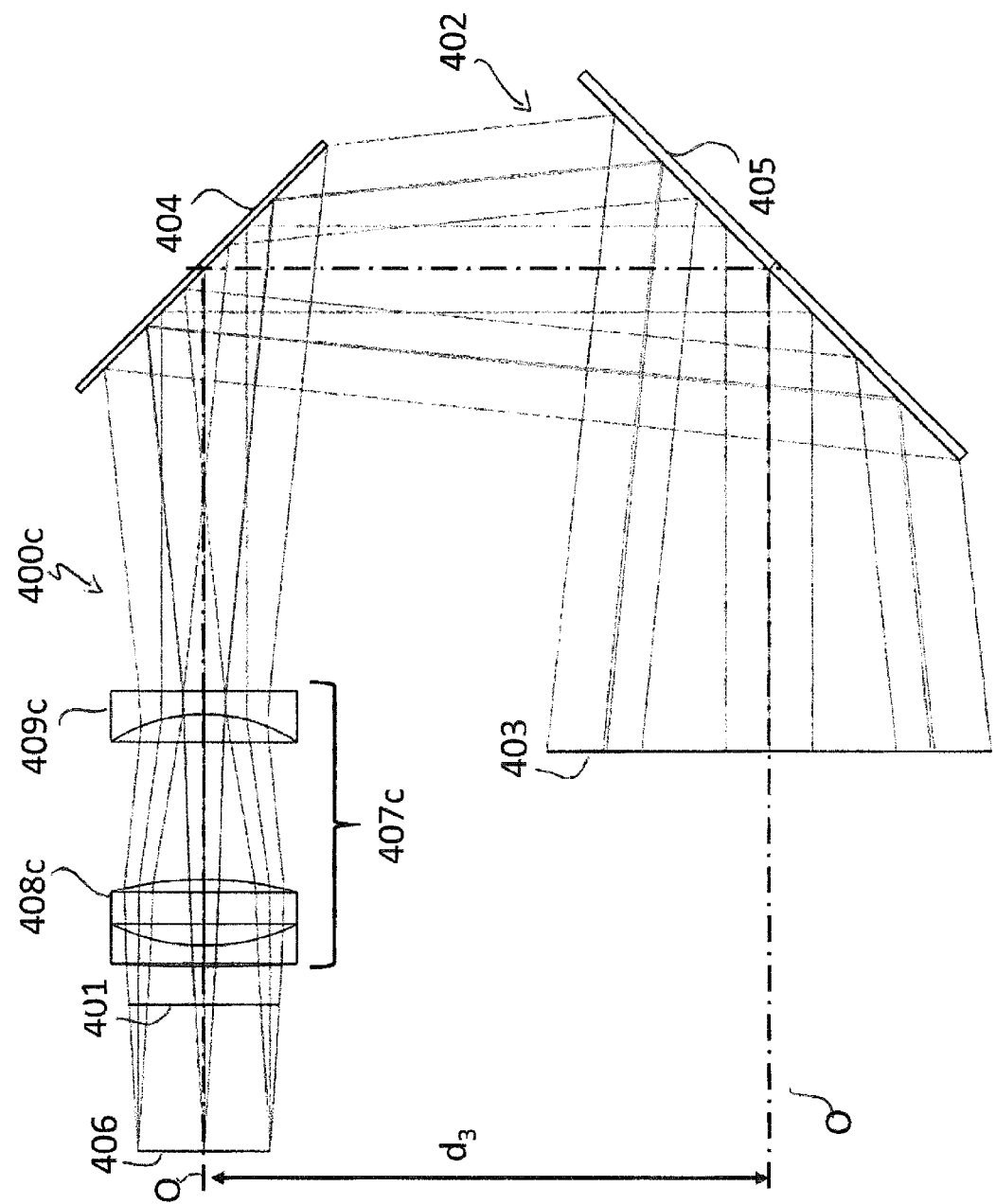
Figure 4D:
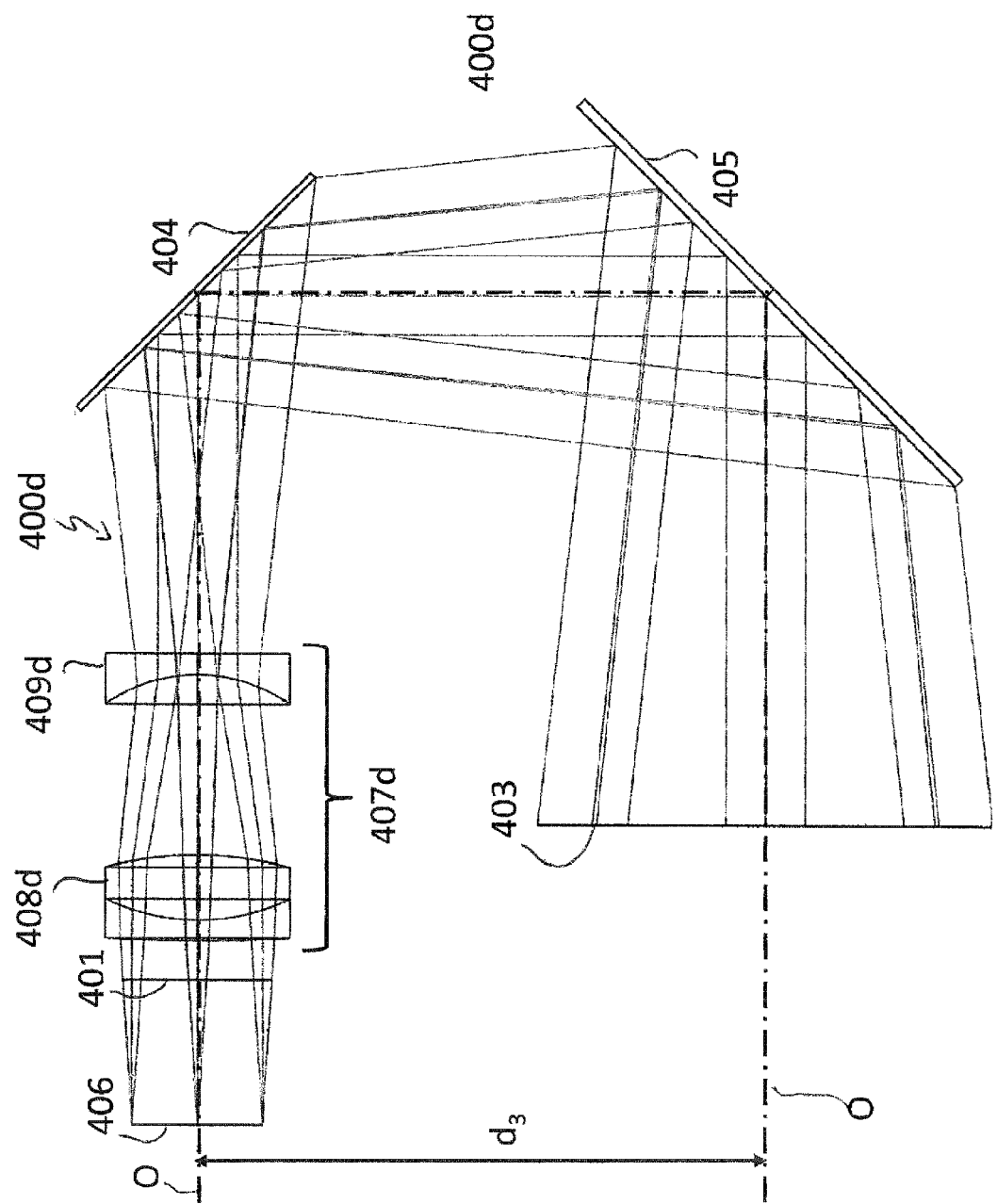

In FIGS. 3a to 3d, a second exemplary embodiment of the changing system is shown which is likewise designed in accordance with the concept explained in the preceding. The changing system according to the second exemplary embodiment comprises an enlargement changing module 300a with an enlargement level of 1, as shown in FIG. 3a; an enlargement changing module 300b with an enlargement level of 1.05, as shown in FIG. 3b; an enlargement changing module 300c with an enlargement level of 1.5, as shown in FIG. 3c; and an enlargement changing module 300d with an enlargement level of 1.6, as shown in FIG. 3d.

Also in this exemplary embodiment, all enlargement changing modules 300a to 300d respectively have a changing surface on the light entry side 301; a light deflection system formed 302 formed from two deflection mirrors 304, 305; a changing surface on the light exit side 303; and an entry pupil 306. In addition (in contrast to the enlargement changing module 300a with the enlargement level of 1), the enlargement changing modules 300b, 300c, and 300d respectively have an enlargement system 307b, 307c, and 307d which is formed by two lens groups 308b, 309b; or 308c, 309c; or 308d, 309d, respectively, and represents a Keplerian telescope.

In this exemplary embodiment, the light deflection systems 304 used in the individual enlargement changing modules 300a to 300d are also designed, under consideration of the enlargement effects of the enlargement systems 307b, 307c, and 307d, in such a way that the exit pupil of the lens 12 is mapped onto the same location in all modules.

The second exemplary embodiment differs from the changing system depicted in FIGS. 2a to 2d in that the part of the optical axis O passing through the changing surface on the light exit side 303 is deflected at a right angle by the light deflection system 302 relative to the part of the optical axis O passing through the changing surface on the light entry side 301. Thus, the enlargement changing modules 300a to 300d of the second exemplary embodiment respectively produce a beam deflection of 90°. For the purposes of this beam deflection, the two deflection mirrors 304 and 305 are respectively tilted by 22.5° with respect to the optical axis O (referring to an alignment orthogonal to the optical axis). By a suitable positioning of the second deflection mirror 305 relative to the first deflection mirror 304, it can now be ensured for each of the enlargement changing modules 300a to 300d that a stationary mapping of the exit pupil of the lens 10 is provided.

The distance designated as $d_2$ in FIGS. 3a to 3d, which is the distance of the optical axis O passing through the respective changing surface on the light exit side 303 from the changing surface on the light entry side 301, is the same in all enlargement changing modules 300a to 300d. The distance $d_2$ is in turn selected such that the mapping is possible without any vignetting, taking into account the maximum pupil sizes and field angles as provided in the system design for all enlargement changing modules 300a to 300d.

Finally, FIGS. 4a to 4d show a third exemplary embodiment which in turn provides four enlargement changing modules 400a to 400d with the enlargement levels 1.0, 1.05, 1.5, and 1.6. In turn, the enlargement changing modules 400a to 400d respectively comprise a changing surface on the light entry side 401, a light deflection system 402 which is formed from two deflection mirrors 404 and 405, a changing surface on the light exit side 403, and an entry pupil 406. The enlargement changing modules 400b, 400c, and 400d, which have an enlargement level different than 1, additionally respectively include an enlargement system 407b, 407c, and 407d that is made up of two lens groups 408b, 409b, 408c, 409c, 408d, 409d and represents a Keplerian telescope.

In contrast to the two previously described exemplary embodiments, the third exemplary embodiment is designed for a beam deflection of 180°. Accordingly, the two deflection mirrors 404 and 405 that form the light deflection system 402 are respectively inclined by 45° relative to the optical axis. For reasons of reflectivity and polarization, this arrangement of the two deflection mirrors 404, 405 at equal angles is preferred in comparison to an arrangement in which the deflection mirrors are inclined at different angles relative to the optical axis, although the latter is also of course not precluded.

Given the enlargement changing modules 400a to 400d, the light entering via the respective changing surface 401 is deflected in such a manner that it exits from the changing surface 403 with a parallel offset in a direction counter to the light entry direction. The part of the optical axis O that passes through the changing surface on the light exit side 203 thus experiences an offset, designated with $d_3$ in FIGS. 4a through 4d, relative to the part of the optical axis O that passes through the changing surface on the light entry side 202. For all enlargement changing modules 400a to 400b, the offset $d_3$ is chosen so that the mapping is possible without vignetting, taking into account the pupil sizes and field angles.

As a comparison of FIGS. 4a to 4d shows, the two deflection mirrors 404 and 405 are effectively displaced jointly along the light entry side or the light exit side part of the optical axis O, across the various enlargement changing modules 400a to 400b, in order to ensure that the image of the exit pupil, the position of which is influenced by the different enlargement effects of the enlargement systems 407b, 407c, and 407d, remains stationary for all modules.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A changing system for a microscope, the changing system comprising:

multiple afocal enlargement changing modules of different enlargement levels that are optionally introducible into an infinite beam path running along an optical axis of the microscope, wherein each of the enlargement changing modules contain a light deflection system, and wherein the light deflection systems are configured to adjust the path length of the infinite beam path passing through the respective enlargement changing module such that all of the enlargement changing modules, regardless of the different enlargement levels of the enlargement changing modules, map an exit pupil of a lens of the microscope onto the same location along the optical axis.

2. The changing system according to claim 1, wherein each of the enlargement changing modules have a module body that has a changing surface on a light entry side and a changing surface on a light exit side, and wherein the two changing surfaces are arranged identically relative to one another in all of the module bodies.

3. The changing system according to claim 1, wherein each of the enlargement changing modules includes an enlargement system.

4. The changing system according to claim 3, wherein, in each of the enlargement changing modules, the enlargement system is arranged downstream of the light deflection system in the infinite beam path.

5. The changing system according to claim 3, wherein, in each of the enlargement changing modules, the enlargement system comprises a Keplerian telescope or a Galilean telescope.

6. The changing system according to claim 1, wherein each of the light deflection systems produce an identical offset of a part of the optical axis passing through a changing surface on a light exit side relative to a part of the optical axis passing through a changing surface on a light entry side.

7. The changing system according to claim 6, wherein the part of the optical axis passing through the changing surface on the light exit side has a predetermined parallel offset relative to the part of the optical axis passing through the changing surface on the light entry side.

8. The changing system according to claim 6, wherein the part of the optical axis passing through the changing surface on the light exit side is deflected at a right angle relative to the part of the optical axis passing through the changing surface on the light entry side, and is arranged at a predetermined distance from the changing surface on the light entry side.

9. The changing system according to claim 1, wherein each of the light deflection systems comprise at least one first and one second light-reflecting element, wherein the first light-reflecting element is arranged at the part of the optical axis passing through the changing surface on the light entry side, and the second light-reflecting element is arranged at the part of the optical axis passing through the changing surface on the light entry side.

10. The changing system according to claim 9, wherein the first and the second light-reflecting elements are parts of a mirror arrangement or of a prism.

11. The changing system according to claim 1, wherein one of the enlargement changing modules has an enlargement level equal to 1.

12. An afocal enlargement changing module for a microscope, the enlargement changing module being introducible into an infinite beam path running along an optical axis of the microscope, the enlargement changing module comprising:

a first changing surface;

a second changing surface;

a light deflection system comprising a first deflection mirror and a second deflection mirror, the light deflection system being configured to adjust a path length of the infinite beam path entering the first changing surface, passing through the enlargement changing module, and exiting the second changing surface such that the enlargement changing module maps an exit pupil of a lens of the microscope onto a predetermined location along the optical axis; and an enlargement system comprising a first lens group and a second lens group.

13. The afocal enlargement changing module according to claim 12, wherein the enlargement system is arranged downstream of the light deflection system in the infinite beam path.

14. A microscope, comprising:

a lens having an exit pupil; and an afocal enlargement changing module for the microscope, the enlargement changing module being introducible into an infinite beam path running along an optical axis of the microscope, the enlargement changing module comprising:

a light deflection system configured to adjust a path length of the infinite beam path passing through the enlargement changing module such that the enlargement changing module maps an exit pupil of a lens of the microscope onto a predetermined location along the optical axis; and an enlargement system.

15. The microscope according to claim 14, wherein an optical component is arranged at the location of an image of the exit pupil of the lens, the image being producible by the enlargement changing module.

16. The microscope according to claim 15, wherein the optical component comprises a spatial light modulator, a micromirror arrangement, or a phase-influencing mask.

17. The microscope according to claim 14, further comprising a 4f system, wherein the respective enlargement module is part of the 4f system.

* * * * *